No. 757,000. PATENTED APR. 12, 1904.
R. S. WHITE.
DEMAND METER.
APPLICATION FILED AUG. 15, 1903.
NO MODEL.
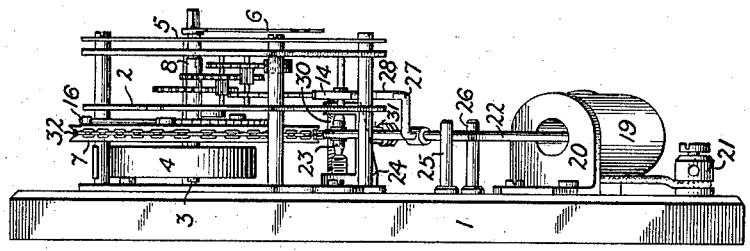
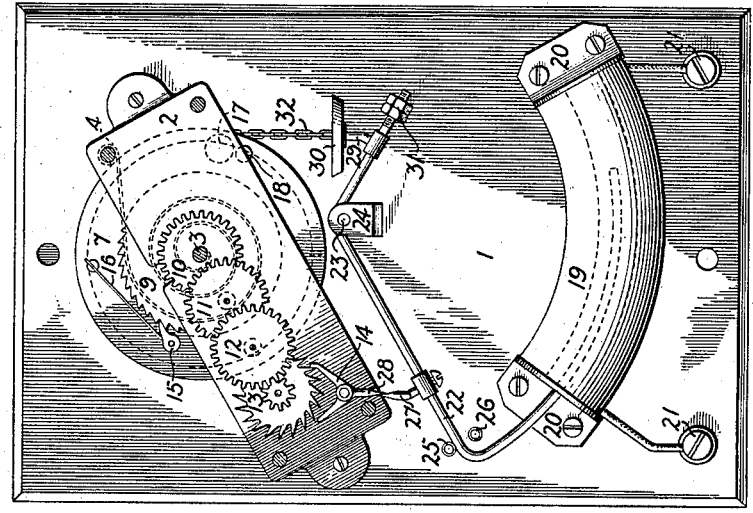
Witnesses
Harry N. Tilden
Helen Offord
Inventor.
Roger S. White.
by Allen S. Davis
Atty No. 757,000. Patented April 12, 1904.

UNITED STATES PATENT OFFICE.

ROGER S. WHITE, OF PHILADELPHIA, PENNSYLVANIA, ASSIGNOR TO GENERAL ELECTRIC COMPANY, A CORPORATION OF NEW YORK.

DEMAND-METER.

SPECIFICATION forming part of Letters Patent No. 757,000, dated April 12, 1904.

Application filed August 15, 1903. Serial No. 169,619. (No model.)

*To all whom it may concern:*

Be it known that I, ROGER S. WHITE, a citizen of the United States, residing at Philadelphia, in the county of Philadelphia, State of Pennsylvania, have invented certain new and useful Improvements in Demand-Meters, of which the following is a specification.

This invention relates to a maximum-demand meter, an instrument for measuring the maximum strength of current used at any time in a circuit or branch circuit. Devices of this kind are well known in the art, their purpose being to afford station managers a means for graduating their charges for electric energy on the greatest amount of current used at any time, as well as on the total energy used in a circuit or branch circuit during a certain period. The reason for graduating charges in this manner is to induce consumers to use current at as uniform a rate as possible, as the current consumed in excess of the average is the more expensive to generate, since it requires additional machinery which is in use only a part of the time.

In carrying out my invention I provide a magnet-coil, which is connected in series in the circuit or branch the maximum current of which is to be measured, and a movable core for this coil which when attracted releases mechanism driving the indicator of the instrument. This mechanism is so arranged that while moving the indicator over the dial-face it accumulates a weight opposing the magnetic attraction of the coil, and when this weight is great enough to overcome that attraction it draws the core back from its attracted position and applies a stop to the mechanism.

My device in addition to being very compact and substantial possesses the advantage that it does not indicate the total current flowing during a momentary overload, such as would be caused by a temporary short-circuit. Such an overload would start the mechanism; but if it were only momentary the mechanism would be stopped as soon as the normal current flowed through the circuit again.

My invention therefore comprises a maximum-demand meter having mechanism for actuating an indicator, a device responsive to current conditions for releasing the mechanism, and means whereby the operation of the mechanism stores energy opposing the action of the releasing device and tending to stop the mechanism. It also comprises other features of novelty, which will be more fully described hereinafter and definitely pointed out in the appended claims.

In the accompanying drawings, which illustrate an embodiment of my invention, Figure 1 is an elevation of my demand-meter having the casing, the dial, and the front plate of the frame removed; and Fig. 2 is a side elevation of the same with the casing only removed.

In the drawings, 1 is a base, preferably of slate, to which is secured a frame 2. Pivoted in this frame is a shaft 3, driven by a spring 4, one end of which is secured to the shaft and the other end to a post of the frame. The shaft 3 extends through the front plate of the frame and the dial-face 5 and carries the index 6, which moves over the dial-face. The end of this shaft is squared off to be gripped by a key. Mounted on the shaft 3 is a wheel 7, the periphery of which is grooved, and a sleeve 8, on which are rigidly mounted a ratchet-wheel 9 and the first wheel 10 of a train 10 11 12 driving the escapement-wheel 13. The movement of the train of gears is governed by a pallet 14, coöperating with the escapement-wheel 13 in the ordinary way, and this pallet is provided with an additional arm 28, terminating in a knife-edge, for a purpose hereinafter to be described. A pawl 15 is pivoted on one face of the wheel 7 in coöperative relation to the ratchet 9 and held in engagement with the teeth of the ratchet by a light spring 16. The gear-train therefore moves with the wheel 7 when the latter is driven by the spring 4; but the wheel may be turned in the opposite direction, without affecting the gear-train, to rewind the spring 4 and reset the index 6 at zero by a key applied to the squared end of shaft 3, a provision commonly adopted in clock-movements. On one of the plates of the frame is a stop 17, and coöperating with this to prevent further movement of the shaft 3 when the index has been reset at zero is a stop 18, mounted on the face of the wheel 7.

Mounted on the base below the mechanism just described is a magnet-coil 19, curved in the arc of a circle and supported between brackets 20 20, secured to the base. The ends of the coil are brought out to binding-posts 21 21, by which the coil is connected in series in the circuit or branch circuit the current of which is to be measured. The magnet-coil is provided with a movable core 22, preferably a piece of heavy iron wire bent as shown in Fig. 1, secured to an arbor 23, which is pivotally mounted in a frame 24, secured to the base at the center of the circle of which the coil 19 forms an arc. The core 22 is therefore free to rock on its pivot when attracted and released by the magnet-coil between limits set by the stop-pins 25 26, mounted on the base. Fastened to the core is an arm 27, provided with a knife-edge, as shown in the drawings, in coöperative relation to a similar knife-edge on arm 28 of the pallet 14. The arrangement of these parts is such that when the core is drawn by the coil against the pin 26 the two knife-edges are separated, but when the position of the core is changed and it approaches the other limit of its movement the knife-edge of arm 27 crosses the path of movement of the end of arm 28 of the pallet and stops the movement of the pallet, the train of gears, and the indicator. Secured to the core 22 on the other side of its pivot is an arm 29, carrying a pan 30, and beyond the arm 29 the core is threaded and carries the adjustable weights 31 for regulating the balance of the core on its pivot. Lying in the groove in the periphery of wheel 7 is a chain 32, one end of which is securely fastened to the wheel. The other end of the chain hangs free directly over the center of pan 30, and the length of the chain is such that when the wheel 7 has been turned back so that stop 18 abuts against stop 17 and the index is at zero the free end of the chain 32 just clears the bottom of pan 30. If desired, this end of the chain may be secured to the bottom of the pan at its center. The instrument may be inclosed in a suitable casing having a glass over the dial-face.

The operation of the device is as follows: The indicator is set at zero and the spring rewound by a key fitting over the end of shaft 3, the pawl 15 slipping over the teeth of ratchet 9, so that the wheel-train is not moved. When the stop 18 is brought up against stop 17, the index is at zero and the end of the chain just clears the pan. The weights 31 are then adjusted so that the core 22 is held lightly against stop 25. The coil 19 is connected in series in the circuit. When current is used in the circuit, the coil attracts core 22, drawing it down against stop 26, separating the arms 27 and 28, and thus releasing the pallet 14. The wheel-train is then driven by spring 4, moving the index slowly over the dial-face and unwinding the chain 32 into the pan 30 until its accumulated weight overcomes the attraction of the coil and moves the core back against stop 25, the knife-edge of arm 27 crossing the path of movement of the arm 28 of the pallet and stopping the movement of the train of gears and the indicator. The parts will remain in this position until a greater current is used in the circuit, when the attraction of the magnet-coil will be sufficient to overcome the weight of that portion of the chain which rests in the pan and start the indicating mechanism, as before.

Many variations can be made in my device—such, for instance, as using a straight coil and core instead of a curved coil and pivoted core or arranging the mechanism to strain a spring instead of to accumulate a weight—without departing from the spirit of my invention. The drawings merely illustrate the preferred construction.

What I claim as new, and desire to secure by Letters Patent of the United States, is—

1. In an electric meter, the combination of an indicator, mechanism for actuating the indicator, an electroresponsive device for releasing the mechanism, and means whereby the operation of the mechanism stores energy opposing the action of said device.

2. A maximum-demand meter, comprising an indicator, mechanism for actuating the indicator, a device responsive to current conditions for releasing the mechanism, and means whereby the movement of the mechanism stores energy to counterbalance said device.

3. A maximum-demand meter, comprising an indicator, mechanism for actuating the indicator, a device responsive to current conditions for releasing the mechanism, and means whereby the movement of the mechanism accumulates a weight tending to stop the mechanism.

4. A maximum-demand meter, comprising a magnet-coil, an armature therefor, an indicator, actuating mechanism therefor, means whereby the armature when attracted releases the driving mechanism, and means whereby the mechanism when released tends to move said armature into braking relation to the mechanism.

5. A maximum-demand meter, comprising an indicator, actuating mechanism therefor, a magnet-coil, an armature therefor, means whereby the armature when attracted releases the driving mechanism, and means whereby a weight tending to move said armature into braking relation to the driving mechanism is progressively increased while said mechanism is running.

6. A maximum-demand meter, comprising an indicator, actuating mechanism therefor, an arm carrying means for stopping the mechanism, a device responsive to current conditions for moving the arm in a direction to release the mechanism, and means whereby the mechanism when released increases a weight tending to move the arm in the opposite direction.

7. A maximum-demand meter, comprising an indicator, actuating mechanism therefor, a a magnet, an armature therefor, a receptacle secured to the armature, means whereby the armature releases said driving mechanism when attracted by the magnet, and means whereby said mechanism when released accumulates a weight in said receptacle to overcome the attraction of the magnet.

8. A maximum-demand meter, comprising an indicator, actuating mechanism therefor, a pallet governing said mechanism, a magnet-coil, a core therefor arranged to prevent movement of the pallet when the core is released by the magnet-coil, and means whereby the operation of the mechanism accumulates energy opposing the attraction of the magnet-coil.

9. A maximum-demand meter, comprising an indicator, actuating mechanism therefor, a pallet governing the same, an arm on the pallet, a magnet-coil, an armature and an arm secured thereto arranged so that the said arms are separated when the magnet attracts its armature, and means whereby the operation of the mechanism tends to move the last-mentioned arm into the path of movement of the arm on the pallet.

10. A maximum-demand meter, comprising an indicator, actuating mechanism therefor, a device responsive to current conditions for releasing said mechanism, means opposing said releasing device progressively increased in power by the movement of the mechanism, and means for resetting the parts of the mechanism affected without moving the other parts.

In witness whereof I have hereunto set my hand this 13th day of August, 1903.

ROGER S. WHITE.

Witnesses:
EDWIN J. CASTLE,
KIRK F. BROWN.